United States Patent [19]

Shiozawa et al.

[11] 4,429,975

[45] Feb. 7, 1984

[54] CONTROL CIRCUIT FOR CAMERAS HAVING INTERNAL AND EXTERNAL POWER SUPPLIES

[75] Inventors: Kazuo Shiozawa; Hideaki Sakai, both of Hachioji, Japan

[73] Assignee: Konishiroku Photo Industry Co., Ltd., Tokyo, Japan

[21] Appl. No.: 379,757

[22] Filed: May 19, 1982

[30] Foreign Application Priority Data

May 28, 1981 [JP] Japan ................................ 56-80056

[51] Int. Cl.³ .......................... G03B 17/00; H02J 1/00
[52] U.S. Cl. ....................................... 354/202; 307/29
[58] Field of Search ............... 354/60 R, 75, 76, 60 F, 354/126, 145, 173, 202, 295; 307/23, 29, 66, 80, 86, 150

[56] References Cited

U.S. PATENT DOCUMENTS

| | | | |
|---|---|---|---|
| 2,358,796 | 9/1944 | Edgerton | 354/145 X |
| 4,091,395 | 5/1978 | Kozuki et al. | 354/60 R X |
| 4,091,400 | 5/1978 | Land | 354/202 |
| 4,156,565 | 5/1979 | Harrison | 354/60 F X |
| 4,175,846 | 11/1979 | Nozawa et al. | 354/173 |

*Primary Examiner*—William B. Perkey
*Attorney, Agent, or Firm*—Jordan B. Bierman; Linda Bierman; C. Cornell Remsen, Jr.

[57] ABSTRACT

A camera may contain a plurality of operable elements such as small motors for actuating mechanisms such as a mirror, shutter, diaphragm, film, transport, etc., supplied with power from a self-contained battery. Because of the low power of the battery certain of the operable elements are actuated sequentially whereas parallel operation thereof would be preferable. The present invention provides circuitry which automatically changes the sequential operation of the elements to parallel operation whenever the self-contained source of power is replaced by an external power source.

3 Claims, 7 Drawing Figures

CONTROL CIRCUIT FOR CAMERAS HAVING INTERNAL AND EXTERNAL POWER SUPPLIES

BACKGROUND OF THE INVENTION

1. Field of the Invention:

The present invention relates to a camera having a plurality of elements those are operated by being supplied with electric current such as a motor which drive the elements in series, said device is so designed as to alternate the driving system in the case of utilizing an external electric power source.

2. Description of the Prior Art:

In a camera having a plurality of elements those are operated by being supplied with electric current such as motors, there are mostly adopted such a driving system driving these elements one after another in series, owing to the limitation of the capacity of a built-in battery. However, in a single-lens reflex camera, for example, the motor for charging the mirror box is driven at first and a film transport motor is then driven, so that the interval from a shutter release to the next release cannot be shortened farther than the total of the driving periods of both motors.

SUMMARY OF THE INVENTION

The present invention is to conventionally drive elements such as actuators in series in the case of using a built-in battery having a limited capacity; and is to automatically connect a plurality of elements in parallel with each other and to drive them simultaneously in the case of additionally attaching with and switching to an external auxiliary electric power source so that the driving time can be shortened.

DETAILED DESCRIPTION OF THE PREFERRED EMBODIMENTS

Figure 1:
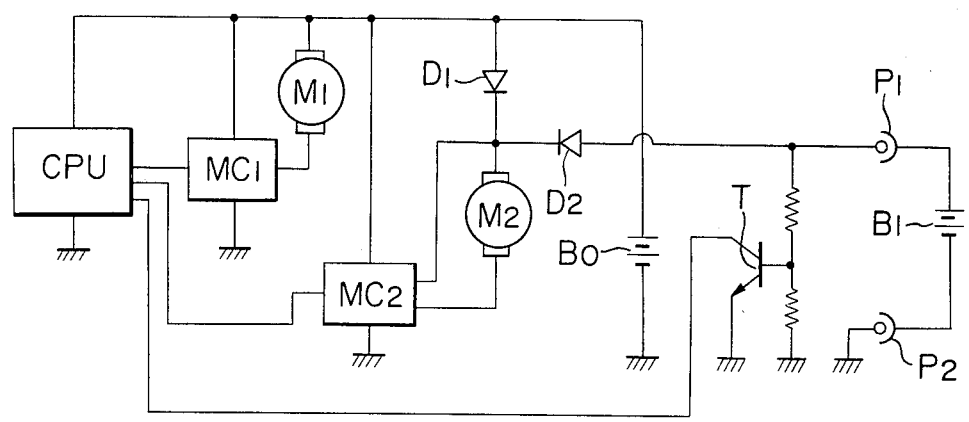
FIG. 1 through FIG. 7 are the control circuit diagrams of the driving device of the invention shown in Examples 1 through 7, respectively.

The invention will be described in more detail with reference to the drawings. There have publicly been known such a camera in which actuators such as motors are driven by built-in batteries, therefore, the only control circuit thereof is shown in the drawings.

In FIG. 1 sequence control circuit CPU controls driving of motor $M_1$ for charging such mechanism as a mirror, shutter and diaphragm and driving of motor $M_2$ for transporting film by giving control circuits $MC_1$ and $MC_2$ signals. The control circuits $MC_1$ and $MC_2$ control electric current flowing into motor $M_1$ and motor $M_2$ respectively. In the case that external electric power source $B_1$ such as an auxiliary battery box is so as to be connected to such a camera as described above through connectors $P_1$, $P_2$, said external electric power source $B_1$ is connected to motor $M_2$ through diode $D_2$ and at the same time the divided voltage of said power source is applied onto the substratum of transistor T to make the transistor conductive, so that the driving modes of motors $M_1$, $M_2$ of the sequence control circuit CPU are switched from the driving mode in series to the mode of a parallel and simultaneous driving. Diode $D_1$ is inserted so as to prohibit from passing an electrical current from external power source $B_1$ to motor $M_1$, and diode $D_2$ is inserted so as to prevent an accident such as a short circuit from occurring due to the voltage applied between the connectors by built-in battery $B_0$. In this embodiment, if the voltage of external power source $B_1$ becomes lower than that of built-in battery $B_0$, then the electric current is supplied mainly from battery $B_0$.

In the example shown in FIG. 1, the driving of motor $M_2$ by built-in battery $B_0$ causes as much loss of the voltage applied to motor $M_2$ as the forward voltage of diode $D_1$. In the example shown in FIG. 2, such loss of the voltage can be avoided by switching switch S from a to b when external power source $B_1$ is connected. It is also easy to operate this switching automatically as the connection is made by the connectors for the external power source.

Figure 2:
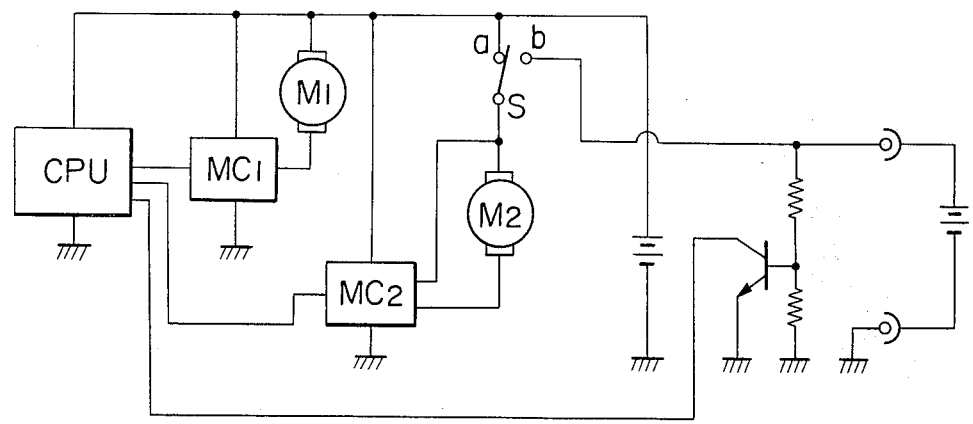

In the example shown in FIG. 2, the built-in battery $B_0$ cannot back up external battery $B_1$ even in the case that the external battery $B_1$ shows abnormal signs such as dead battery or something wrong therewith.

Figure 3:
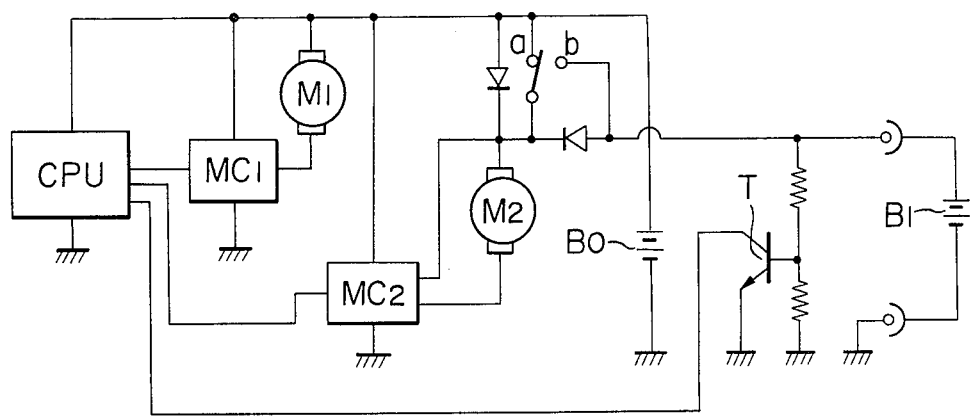

FIG. 3 illustrates a circuit complex of the circuits of each shown respectively in FIG. 1 and FIG. 2, in which motor $M_2$ is driven juxtaposedly together with motor $M_1$ at the same time through the contact point of each of switches a and b when external battery $B_1$ works in order, while in case of an abnormality such backing-up is operated by the built-in battery $B_0$ through diode $D_1$.

Figure 4:
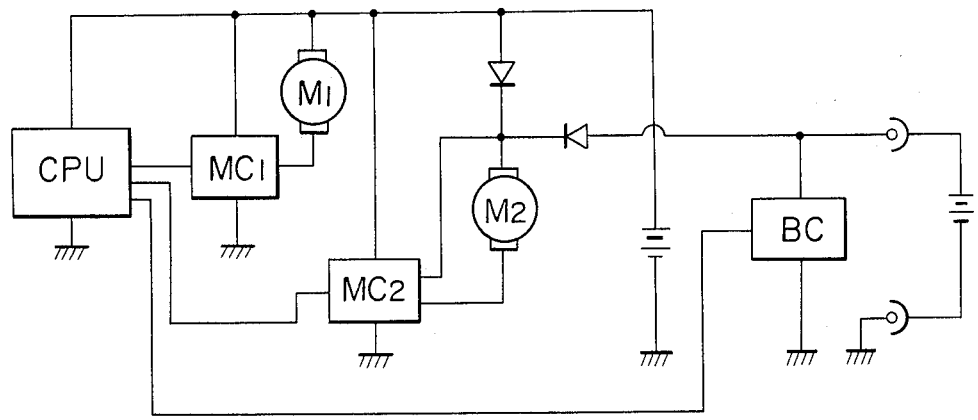

In the every above-given example, external batteries $B_1$ were not checked on, but in the example shown in FIG. 4 the transistor T of the example in FIG. 1 was replaced by the battery-check circuit BC. Said battery-check circuit BC gives a signal in only the case that the voltage of external battery $B_1$ is effective enough, to switch the controls of motors $M_1$ and $M_2$ from the control in series to the control in a simultaneous and juxtaposed series.

Figure 5:
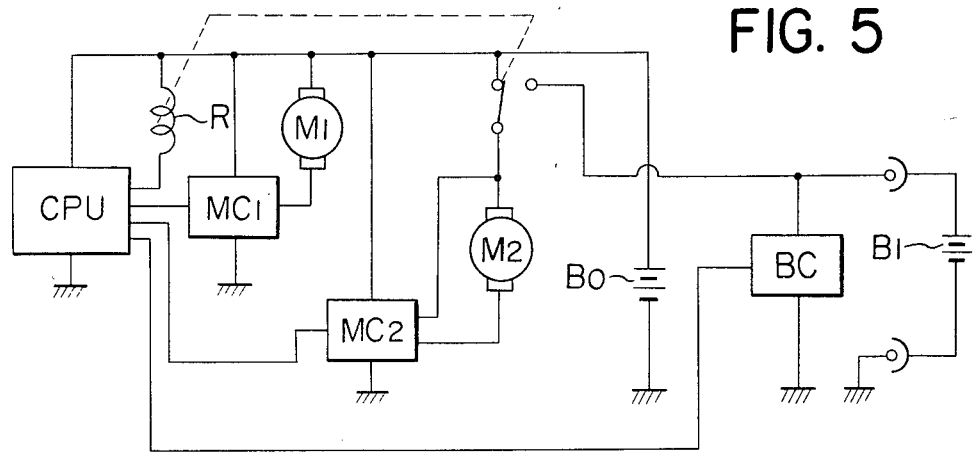

The example shown in FIG. 5 that corresponds to the example shown in FIG. 2, was designed so that sequence-control circuit CPU makes relay R operate at a fixed timing rate in accordance with a signal given from battery-check circuit BC to switch switch S to another line. Thereby, there is eliminated the voltage loss caused by diode $D_1$. Also there is no danger such as an unconditional switching of switch S which could be happened by the connection to an external battery, and in addition, there are such good effects as that no externally operation switch is required to provide for switching.

Figure 6:
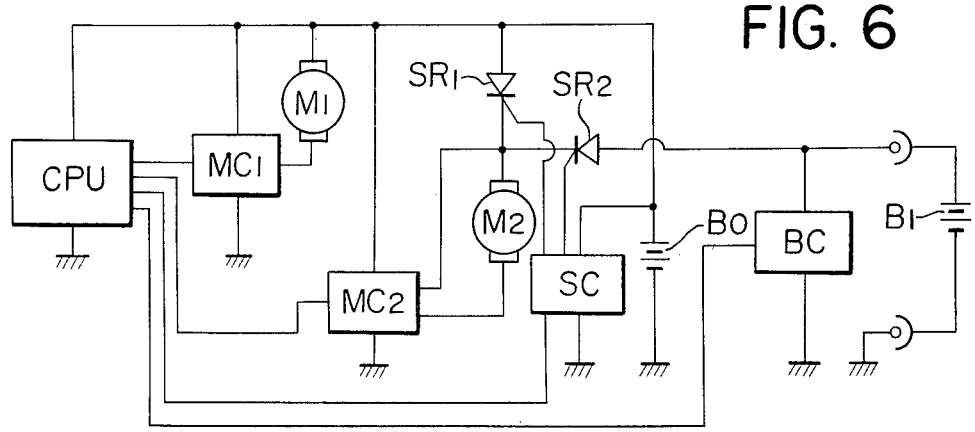

FIG. 6 illustrates an example to which electronic switches such as a thyristor were provided in place of such relay switches as given in FIG. 5, and in which sequence control circuit CPU switches the thyristors $SR_1$, $SR_2$ through thyristor control circuit SC, in accordance with a signal given from battery-check circuit BC.

Figure 7:
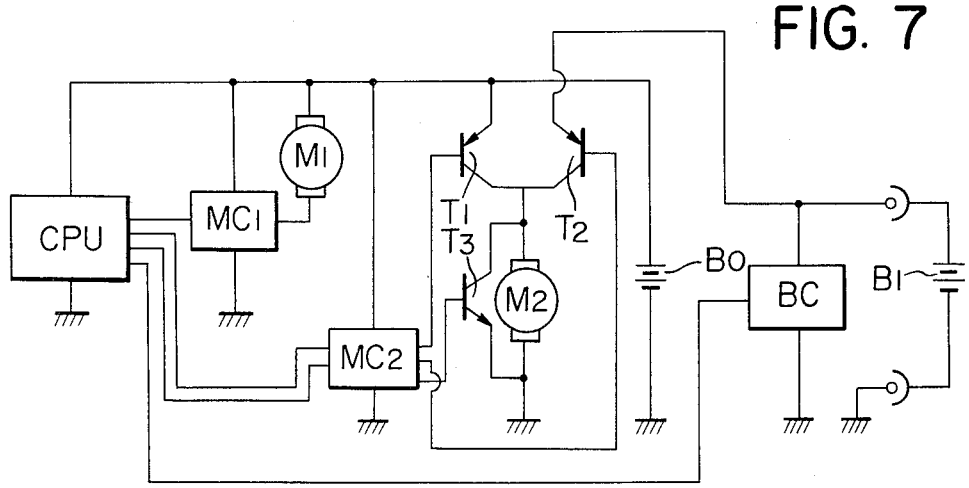

FIG. 7 illustrates another example in which transistors $T_1$, $T_2$ were used in place of such thyristors as given in FIG. 6 without providing any special circuit for controlling said electronic switches so that the electronic switches can be controlled through control circuit $MC_2$ for motor $M_2$. Further, $T_3$ is a transistor for braking motor $M_2$.

In the invention, a plurality of actuators such as motors are driven in series in the case that the capacity of power source is small as described above, and said actuators are switched manually or automatically to be driven in juxtaposed and simultaneous series in the case that an auxiliary power source is connected, so that a driving time can be shortened to the equivalent degree thereof needed when used a single actuator. And, even in the case that the battery performance is lowered in a low temperature condition, it is also effective because the transmitting time of electricity can be shortened as a whole.

In said example, there is shown the embodiment arranged with two pieces of actuator. And it is similar the above case even if a case may take no less than three pieces thereof. And a simultaneous and juxtaposed drive means not only such a case that every one of not less than three pieces of actuator is simultaneously driven altogether, but also such a case that they are divided into the plural number of groups to be simultaneously driven altogether while the plural number of the actuators inside one of the groups are driven in series.

In this description, the term, a control in series, means that, in the case for controlling a motor driving, for example, each of the motors do not operate in parallel timewise, but is controlled so as to be operated one after another, in principle, however, taking the response speed of a switch or the like, the enertia of a motor, and the like into consideration, said term also includes every case that no influence is substantially effected upon the operation speed, such as the case that the motors are so as to be operated in parallel for a short time in such a transition period mainly as a motive moment and a stop moment. The term, a juxtaposed and simultaneous driving, means that the operating period of actuators of the plural number are substantially and partially overlapped with each other.

In the present invention not only driving of actuators but also charging of electronic flash unit can be carried out juxtaposedly and simultaneously together with such as driving of actuators.

What is claimed is:

1. In a camera of the type in which a plurality of operable elements are operated by a source of power contained therein, the improvement comprising means controlling certain of said elements for sequential operation when connected to said contained source of power, an external source of power, means connecting said external source of power to said operable elements and means responsive to implementation of said connecting means for controlling said certain elements for parallel operation.

2. In a camera according to claim 1 in which said improvement includes means disabling said contained power source when said external source is connected to the camera.

3. In a camera according to claim 1 in which said improvement comprises means for reconnecting said contained source of power to said elements whenever the voltage of said external source of power falls below the voltage of the contained source of power.

* * * * *